US011834006B2

(12) United States Patent
Huf et al.

(10) Patent No.: US 11,834,006 B2
(45) Date of Patent: Dec. 5, 2023

(54) VEHICLE SEAT CONSOLE

(71) Applicant: Bayerische Motoren Werke Aktiengesellschaft, Munich (DE)

(72) Inventors: Andreas Huf, Neusaess (DE); Sylvia Kleindl, Munich (DE); Fabian Koehler, Valley (DE); Robert Martin, Munich (DE); Robert Painer, Munich (DE); Martin Unger, Berlin (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 447 days.

(21) Appl. No.: 17/284,030

(22) PCT Filed: Aug. 28, 2019

(86) PCT No.: PCT/EP2019/072996
§ 371 (c)(1),
(2) Date: Apr. 9, 2021

(87) PCT Pub. No.: WO2020/074172
PCT Pub. Date: Apr. 16, 2020

(65) Prior Publication Data
US 2021/0331626 A1    Oct. 28, 2021

(30) Foreign Application Priority Data
Oct. 9, 2018    (DE) ................. 10 2018 124 929.2

(51) Int. Cl.
*B60N 2/42*    (2006.01)
*B60N 2/427*    (2006.01)
(Continued)

(52) U.S. Cl.
CPC ............... *B60R 7/043* (2013.01); *B60N 2/42* (2013.01); *B60N 2/42709* (2013.01);
(Continued)

(58) Field of Classification Search
CPC . B60R 7/043; B60R 2011/0014; B60N 2/773; B60N 2/793; B60N 2/42;
(Continued)

(56) References Cited

U.S. PATENT DOCUMENTS 3,552,795 A    1/1971 Perkins et al.
3,730,586 A    5/1973 Eggert, Jr.
(Continued)

FOREIGN PATENT DOCUMENTS

| FR | 2.222.250 A1 | 10/1974 |
| WO | WO 2011/004173 A1 | 1/2011 |
| WO | WO 2019/038455 A1 | 2/2019 |

OTHER PUBLICATIONS

International Search Report (PCT/ISA/210) issued in PCT Application No. PCT/EP2019/072996 dated Nov. 4, 2019 with English translation (six (6) pages).

(Continued)

*Primary Examiner* — Rodney B White
(74) *Attorney, Agent, or Firm* — Crowell & Moring, LLP

(57) ABSTRACT

A vehicle seat console has at least one vehicle-side guide element and at least one seat-side guide element which is arranged parallel to the vehicle-side guide element. The vehicle seat console also has at least one longitudinal adjustment device which is acted upon by a drive device and is designed to produce a relative adjustment between the vehicle-side guide element and the seat-side guide element. A force-limiting device with a force-limiting element is provided between the longitudinal adjustment device and the vehicle-side guide element and/or between the longitudinal adjustment device and the seat-side guide element. The force-limiting element has a first deformation section which deforms under the effect of a force acting thereon above a specified force threshold. The force-limiting element has a (Continued)

second deformation section which is guided by a deflecting assembly.

12 Claims, 2 Drawing Sheets

(51) Int. Cl.
  *B60N 2/75* (2018.01)
  *B60R 7/04* (2006.01)
  *B60R 11/00* (2006.01)
(52) U.S. Cl.
  CPC ..... *B60N 2/42727* (2013.01); *B60N 2/42781* (2013.01); *B60N 2/75* (2018.02); *B60N 2/773* (2018.02); *B60N 2/793* (2018.02); *B60R 2011/0014* (2013.01)
(58) Field of Classification Search
  CPC ............ B60N 2/42709; B60N 2/42727; B60N 2/42781; B60N 2/75
  USPC ............ 297/188.14, 188.15, 188.16, 188.17, 297/188.18, 188.19, 216.1–216.2, 411.2, 297/411.32, 411.33, 411.35, 411.38
  See application file for complete search history.

(56) References Cited

U.S. PATENT DOCUMENTS

| | | | |
|---|---|---|---|
| 3,806,190 A | 4/1974 | Winslow | |
| 3,832,002 A | 8/1974 | Eggert, Jr. et al. | |
| 5,249,826 A * | 10/1993 | Bell | B60R 22/1953 280/753 |
| 5,487,562 A | 1/1996 | Hedderly et al. | |
| 5,518,271 A * | 5/1996 | Bell | B60R 21/33 180/274 |
| 5,908,219 A * | 6/1999 | Bohmler | B60N 2/42781 297/468 |
| 6,109,692 A * | 8/2000 | H.ang.land | B60N 2/4228 297/216.19 |
| 6,416,126 B1 * | 7/2002 | H.ang.land | B60N 2/4214 297/216.19 |
| 2004/0232685 A1 | 11/2004 | Gatti et al. | |
| 2009/0050659 A1 * | 2/2009 | Chou | B60R 7/04 224/282 |
| 2020/0189427 A1 | 6/2020 | Huf et al. | |

OTHER PUBLICATIONS

German-language Written Opinion (PCT/ISA/237) issued in PCT Application No. PCT/EP2019/072996 dated Nov. 4, 2019 (six (6) pages).
German-language Search Report issued in German Application No. 10 2018 124 929.2 dated Aug. 12, 2019 with partial English translation (11 pages).
English translation of Chinese Office Action issued in Chinese Application No. 201980065355.X dated Jul. 4, 2022 (two (2) pages).

* cited by examiner

VEHICLE SEAT CONSOLE

BACKGROUND AND SUMMARY OF THE INVENTION

The invention relates to a vehicle seat console. The invention also relates to a vehicle seat having such a vehicle seat console, and to a motor vehicle having at least one such vehicle seat.

Belt systems and airbags are motor-vehicle passenger protection systems which have been recognized for decades. They reduce the loading to which the passengers in a vehicle are subjected in the event of a vehicle collision, usually only when said passengers are in defined, upright sitting positions. However, lying positions are becoming ever more important, particularly in the case of fully automated driving, and therefore adequate protection for passengers in such lying positions also has to be ensured. However, in the event of a vehicle collision, the known passenger protection systems cannot sufficiently reduce the loading to which the passengers are subjected when they are in a lying or semi-lying position.

There is therefore a need for the passenger protection systems to be further developed so that, in the event of a vehicle collision, the acceleration of a vehicle passenger's body, even when the passenger is in a lying or semi-lying position, is limited to a defined level. For this purpose, it is possible to provide a relative displaceability, which damps the kinetic energy, between the vehicle seat and the vehicle chassis. If, for the purpose of the longitudinal adjustment of the seat, the vehicle seat console is provided with a longitudinal adjustment device which is self-locking, for example is provided with a spindle drive, first of all the self-locking has to be neutralized here in order to permit the relative displaceability; a decoupling therefore has to take place in the longitudinal adjustment device. This requires a complicated design with an additional outlay of sensor technology.

It is the object of the present invention to provide a vehicle seat console of the generic type which is designed so that, in the event of a vehicle collision, the loading to which the body of a person sitting on the vehicle seat is subjected is sufficiently limited, even if this person is in a lying or semi-lying position, without complicated sensor technology being required to shut down the self-locking of the longitudinal adjustment device.

This object is achieved by a vehicle seat console having at least one vehicle-mounted guide element and at least one seat-mounted guide element, which is arranged parallel to the vehicle-mounted guide element, and at least one longitudinal adjustment device, which is activated by a drive device and is configured to effect a relative adjustment between the vehicle-mounted guide element and the seat-mounted guide element. A force-limiting apparatus with a force-limiting element is provided between the longitudinal adjustment device and the vehicle-mounted guide element and/or between the longitudinal adjustment device and the seat-mounted guide element. The force-limiting element has a first deformation section which deforms under a force acting thereon above a predetermined force threshold value, and has a second deformation section which is guided by a deflecting arrangement.

The longitudinal adjustment of the vehicle seat takes place in a manner known per se by means of a self-locking longitudinal adjustment device, as a result of which the vehicle seat is adjusted in the longitudinal direction of the vehicle. This apparatus therefore mounts the vehicle seat in a movable manner relative to the vehicle structure. In the event of a collision, the vehicle seat occupied by the passenger, on account of its mass inertia, tries to carry on moving counter to the collision force acting on the vehicle structure. Since the force-limiting apparatus is provided between the longitudinal adjustment device and the vehicle-mounted guide element and/or between the longitudinal adjustment device and the seat-mounted guide element, the force-limiting apparatus forms the required degree of freedom which is necessary for the required relative movement between the vehicle-mounted guide element and the seat-mounted guide element, since the force-limiting apparatus is stiff and immovable in the longitudinal direction, i.e. in the direction of the required relative movement, below a predetermined force threshold value, and since, above the predetermined force threshold value, it permits a relative movement, during which kinetic energy is dissipated. This dissipation of kinetic energy and the conversion thereof into deformation energy takes place firstly in the first deformation section and secondly in the second deformation section.

The force-limiting apparatus that consumes kinetic energy is triggered by the forces which act due to the passenger, belt system and seat in the event of a collision. The requirement of having to undertake decoupling in the longitudinal adjustment device can therefore possibly be omitted. The vehicle seat console according to the invention provides for better passenger protection levels in the event of a collision, in particular for passengers in lying positions, than without force-limiting action.

Further preferred and advantageous refinement features of the vehicle seat console according to the invention are the subject matter of the dependent claims.

The longitudinal adjustment device preferably has a spindle shaft and a spindle nut which is in threaded engagement with the spindle shaft. The self-locking which is inherent to such a spindle drive provides the self-locking property in the longitudinal adjustment device.

It is also advantageous if the force-limiting element is coupled on one side to the longitudinal adjustment device and on the other side to the seat-mounted guide element.

It is also advantageous if the force-limiting element is coupled on one side to the longitudinal adjustment device and on the other side to the vehicle-mounted guide element.

In an advantageous embodiment of the invention, the deflecting arrangement is formed from at least three deflecting elements which are arranged in an alternating manner on two sides of an ideal translation plane of the second deformation section and each have a deflecting section which projects into the translation plane or through the latter. By means of this arrangement of deflecting elements, the second deformation section which is guided between the deflecting elements is deformed in a wavy manner and is clamped between the deflecting elements in the static normal state. If, in the event of a vehicle collision, a high tensile force then acts in an impulse-like manner on the second deformation section, the latter tries to move relative to the deflecting elements, and is pulled through between the deflecting elements. The wavy structure, which is present because of the clamping, of the second deformation section is deformed here, consuming energy, in such a manner that the wave crests are initially smoothed and then reshaped in the opposite direction.

This deformation takes place particularly effectively and uniformly if the deflecting elements are formed by deflecting rollers.

It is advantageously provided that the deformation sections are composed of, or comprise, a plastically deformable material or alternatively an elastically deformable material, wherein preferably at least the second deformation section consists of a metal sheet, or comprises the latter. A threshold value for the deformation force can be determined by the selection of the material characteristics and also the selection of the thickness and/or width of the second deformation section.

An embodiment is particularly advantageous in which at least the second deformation section has different deformation properties over its longitudinal extent. This makes it possible to control the level of the energy which can be dissipated over the course of time and therefore the maximum acceleration acting on a passenger sitting on the vehicle seat.

In a preferred embodiment which can be combined with other embodiments, a rigid connecting device which can be interrupted in the event of a collision is provided between the longitudinal adjustment device and the associated seat-mounted or the associated vehicle-mounted guide element parallel to the force-limiting element. This refinement ensures that, in the normal operating state, a rigid and stiff connection of the vehicle seat to the vehicle structure is always ensured, the connection being severed only in the event of a collision, and therefore only then can the force-limiting apparatus become effective.

An embodiment is also particularly advantageous in which, in the region of the fastening of the force-limiting apparatus to the vehicle-mounted guide element or to the seat-mounted guide element, or in the region of the fastening of the force-limiting apparatus to the longitudinal adjustment device, a section of weakened material strength, for example a locally thinner wall thickness, for example, of the force-limiting apparatus is provided. In this "predetermined tearing section", the material, for example the metal sheet, can begin to tear if the force acting on this fastening region in the event of a collision, or the impulse, becomes too great. In the process, kinetic energy is dissipated and, by the material beginning to tear, is transferred to a "free surface", similarly to the case in which the sheet metal tab is torn open in order to open a drinks can.

The invention also relates to a vehicle seat having a vehicle seat console according to the invention.

In addition, the invention is directed to a motor vehicle having at least one vehicle seat according to the invention.

Preferred exemplary embodiments of the invention along with additional refinement details and further advantages are described and explained in more detail below with reference to the attached drawings.

DETAILED DESCRIPTION OF THE DRAWINGS

Figure 1:
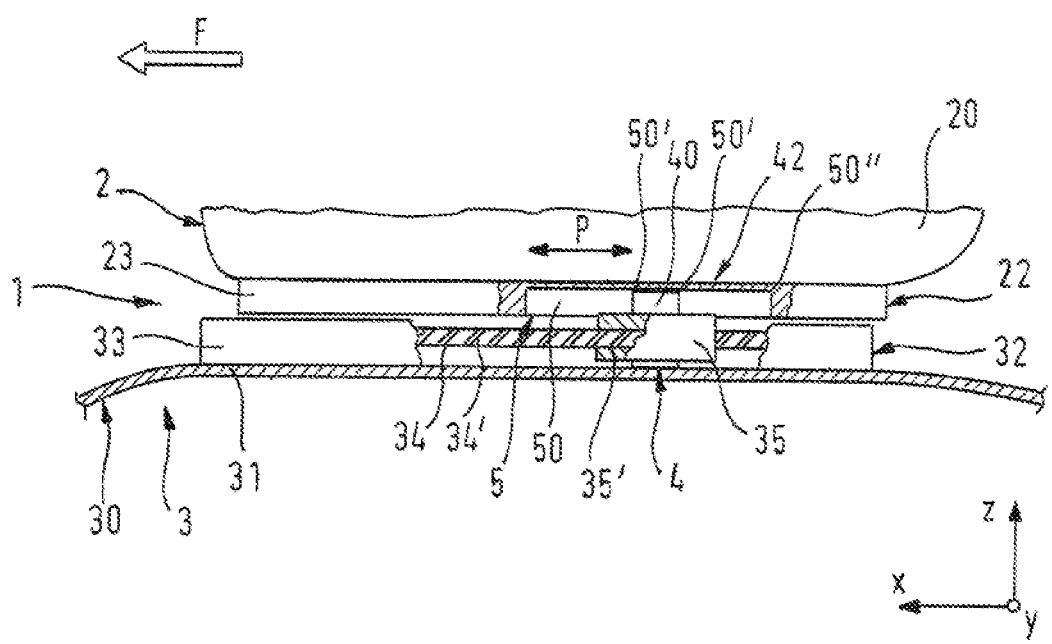
FIG. 1 is a schematic side view of a vehicle seat console according to an embodiment of the invention.

FIG. 1 shows a schematic, partially sectioned side view of a vehicle seat console 1. The vehicle seat console 1 connects a vehicle seat 2 to the chassis 30 of a vehicle 3. For this purpose, the vehicle seat console 1 has left and right, upper and lower guide elements which are oriented in the longitudinal direction x of the vehicle and of which only the left guide elements are shown in FIG. 1; the right guide elements are correspondingly constructed and therefore will not be described further so as to avoid repetitions.

The lower, vehicle-mounted guide element 32 has a lower guide rail 33 which is connected fixedly to the vehicle floor 31 and runs substantially parallel to the longitudinal direction x of the vehicle. An upper guide rail 23, which is fitted on the vehicle seat 2, is in customary sliding engagement with said lower guide rail 33. The upper guide rail 23 forms an upper, seat-mounted guide element 22.

An upper sliding surface and lower sliding surface which are not specifically shown or described in each case in the figures and are advantageously provided, or coated, with a lubricant, are formed between the lower guide rail 33 and the upper guide rail 23. Instead of the sliding surfaces, it is also possible to provide a rolling contact bearing, for example a ball bearing.

The lower guide rail 33 has fitted within or alongside it a spindle shaft 34 which is mounted on the vehicle and extends substantially over the length of the lower guide rail 33 and is provided with an external thread 34'. A spindle nut 35 is fitted on the spindle shaft 34, the spindle nut having an internal thread 35' which is in engagement with the external thread 34' such that the spindle nut 35 by rotation about its longitudinal axis can move along the spindle shaft 34.

In the example shown, the spindle nut 35 is connected to a force-limiting apparatus 5 and is mounted rotatably there in or on a first region 50' of a force-limiting element 50 which extends substantially parallel to the longitudinal direction of the guide elements 22, 32, i.e. parallel to the longitudinal direction x of the vehicle in the installed state of the vehicle seat 2. The force-limiting apparatus 5 is connected for its part to the seat-mounted guide element 22, for which purpose, in the example shown, a second region 50" of the force-limiting element 50 is fitted on the vehicle seat 2 or on the upper guide rail 23, preferably counter to the direction of travel, above or behind the first region 50'. The force-limiting element 50 has a first deformation section 52 and a second deformation section 54, which will also be described further below.

A seat adjustment mechanism 4 is arranged on the vehicle seat 2, for example on the underside of the seat base 20 or on the force-limiting apparatus 5. This seat adjustment mechanism 4 has a drive device 40, for example an electric motor, which is coupled via a drive shaft (not shown) to the spindle nut 35 for transmitting torque, and provide said drive shaft with drive power. Rotation of the drive shaft, which is generated by the drive device 40, gives rise to rotation of the spindle nut 35 which then moves forward in the direction of travel F or rearward in the opposite direction, and carries along the vehicle seat 2 in this direction, as is symbolized by the double arrow P in FIG. 1, in order to effect a desired seat adjustment.

In this way, the lower guide rail 33, the upper guide rail 23, the spindle shaft 34 and the spindle nut 35 form a longitudinal adjustment device 42 for the vehicle seat 2. Owing to the spindle drive, the longitudinal adjustment device 42 forms a self-locking translationary movement unit which has the effect that the vehicle seat 2 normally cannot be inadvertently displaced by application of external forces.

In the event of the vehicle 3 colliding relatively severely with an obstruction or another vehicle, in which collision the collision force has a significant component in the longitudinal direction x of the vehicle, the vehicle 3 is accelerated positively (rear-end impact) or negatively (head-on impact) by the sudden collision force. In the case of this acceleration, the vehicle seat 2 with the person sitting thereon, on account of the inertial mass of this person and of the vehicle seat 2, tries first all to maintain the original speed and direction of movement, whereas the vehicle 3 undergoes the change in speed triggered by the collision-induced acceleration. As a result, the vehicle-mounted guide elements, which are connected fixedly to the vehicle chassis 30, and the seat-mounted guide elements, which are connected or coupled to the vehicle seat 2, on account of the collision-induced forces, try to move relative to one another. These forces act on the deformation sections 52, 54 of the force-limiting element 50 of the force-limiting apparatus 5 and deform the latter, thus permitting a braked relative movement of the vehicle seat 2 with respect to the vehicle chassis 30. The collision acceleration caused by the collision impulse is consequently attenuated by the deformation of the deformation sections 52, 54, and therefore the level of acceleration acting on the vehicle seat 2 and on the person sitting thereon is lower than the collision acceleration. Some of the kinetic energy of the vehicle seat 2 with the person sitting thereon is therefore converted into deformation energy.

The design and the operation of the force-limiting apparatus according to the invention will be explained in more detail below in a first exemplary embodiment with reference to FIG. 2, wherein the figures in each case reproduce only a schematic illustration of the design of the respective force-limiting apparatus 5. The connection of the force-limiting apparatus 5 to the seat-mounted guide element 22 or to the seat 2 and the connection of the spindle nut 35 to the force-limiting apparatus 5 are also merely illustrated schematically. The direction of travel F of the vehicle and therefore the installed position of the force-limiting apparatus 5 in the vehicle seat console 1 are likewise specified in each case in the figures.

The illustration in the figures relates to a vehicle seat 2 facing in the direction of travel F, and the design and the description of the operation of the force-limiting apparatus 5 are based on a head-on collision situation. It is a trivial matter for a person skilled in the art also to adapt the invention to a vehicle seat facing counter to the direction of travel and to flip the force-limiting apparatus in this case by 180°. The same also applies to the configuration of the force-limiting apparatus for a rear-end impact. In addition, it is a trivial matter for a person skilled in the art to provide two force-limiting apparatuses flipped with respect to each other in the vehicle seat console in order to obtain the desired protection of the passengers both in the event of a head-on collision and in the event of a rear-end impact. These variants are therefore likewise encompassed by the invention.

Figure 2:
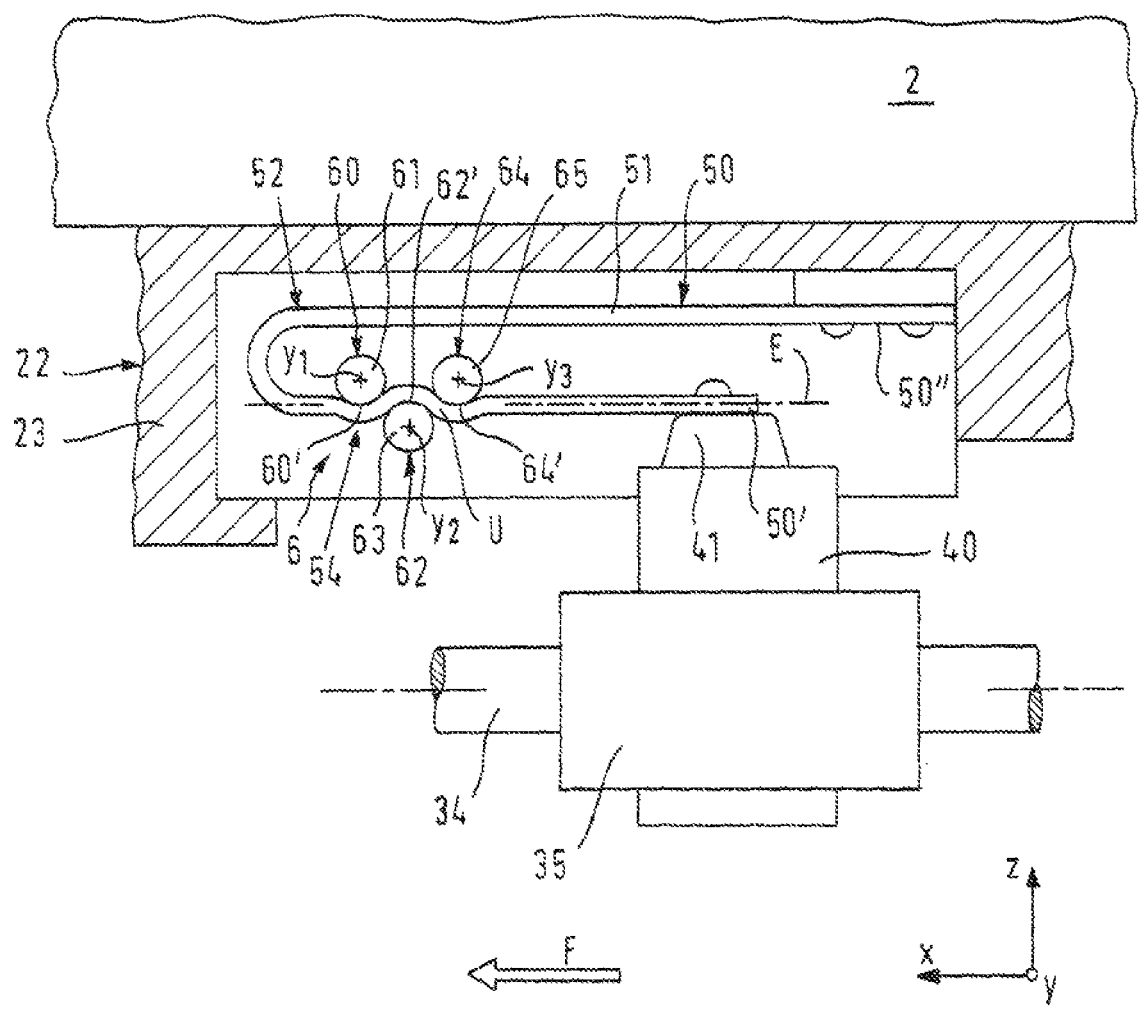
FIG. 2 is an enlarged and more detailed illustration of the force-limiting apparatus having a first and second deformation section.

In the example shown in FIG. 2, the force-limiting element 50 is in the form of a plastically deformable metal sheet 51, the surface extent of which extends substantially in the xy plane of the vehicle seat 2 installed in the vehicle 3. In the illustration of FIG. 2, the force-limiting element 50 is therefore shown only in the thickness extent thereof.

The force-limiting element 50 is fitted at a first end by its first region 50' to a support part 41 which supports the drive device 40 and which rotatably mounts the spindle nut 35. At its other end, the force-limiting element 50 is fixedly connected by its second region 50" to the upper guide rail 23 of the seat-mounted guide element 22.

A first deformation section 52 and a second deformation section 54 of the force-limiting element 50 extend between the first region 50' and the second region 50" of the force-limiting element 50. These deformation sections 52, 54 are designed in such a manner that they deform under a force acting on them above a predetermined force threshold value. The two deformation sections 52, 54 are placed in front of the first section 50' in the direction of travel.

In the first deformation section 52, the force-limiting element 50 is bent through 180° and, in the longitudinal section of FIG. 2, forms a curvature which is open rearward (counter to the direction of travel) in the form of a lying U.

In the event of a head-on collision, such a U-shaped deformation results in the first region 50' being displaced relative to the second region 50" of the force-limiting element 50 and therefore the spindle nut 35 being shifted relative to the vehicle seat 2 in the longitudinal direction x of the vehicle.

If therefore, in the event of a head-on collision, in which the vehicle chassis 30 is suddenly decelerated due to the collision forces, the vehicle seat 2 tries to continue to move in the direction of travel F, the deformation section 52 is thus deformed in such a manner that the 180° curvature of the force-limiting element 50 moves along the deformation section 52. The facing section of the 180° curvature of the force-limiting element 50 for fitting to the upper guide rail 23 is curved in the process and the section thereof facing the support part 41 is extended, as a result of which kinetic energy is in each case converted into deformation energy.

The second deformation section 54 is placed between the first deformation section 52 and the first region 50' of the force-limiting element 50, which region is fitted to the support part 41. This originally flat section of the force-limiting element 50 is guided by a deflecting arrangement 6, i.e. an arrangement of deflecting elements, which, as deflecting elements 60, 62, 64, has three (or more) deflecting rollers 61, 63, 65, between which the second deformation section 54 of the force-limiting element 50 is clamped. These deflecting rollers 61, 63, 65 are arranged in an alternating manner above and below the second deformation section 54 of the force-limiting element 50 and are mounted with respect to the upper guide rail 23 so as to be rotatable about a respective axis of rotation $y_1$, $y_2$, $y_3$ running parallel to the transverse axis y of the vehicle.

The imaginary ideal flat path for guiding the second deformation section 54 of the force-limiting element 50 between the deflecting rollers 61, 63, 65 forms an imaginary translation plane E. However, the deflecting rollers are arranged here in such a manner that their deflecting section 60', 62', 64' in each case facing said imaginary translation plane E projects through said translation plane E. This gives rise to a wave-like deflecting path U along which the second deformation section 54 is guided.

If, in the event of a head-on collision, the vehicle seat 2 now moves further relative to the vehicle chassis 30, the axes of the deflecting rollers 61, 63, 65 move further in the direction of travel F and the deflecting rollers 61, 63, 65 roll along the second deformation section 54, the deflecting rollers deforming the latter in a wave-like manner. The work of deformation used here likewise converts some of the kinetic collision energy into deformation of the force-limiting element 50.

In an embodiment which is not illustrated in the figures, the support part 41 is normally fixedly connected to the upper guide rail by means of a connecting device (not shown) which can be automatically severed in the event of a collision.

The invention also includes providing the force-limiting apparatus 5 (alternatively or additionally) between the spindle shaft 34 and the lower guide rail 33.

The invention is not restricted to the above exemplary embodiments which serve merely to provide a general explanation of the core concept of the invention. Rather, within the scope of protection, the apparatus according to the invention can also take on configurations other than those described above. In particular, the apparatus here can have features which constitute a combination of the respective individual features of the claim.

Reference signs in the claims, the description and the drawings serve merely to provide a better understanding of the invention and are not intended to limit the scope of protection.

LIST OF REFERENCE SIGNS

1 Vehicle seat console
2 Vehicle seat
3 Vehicle
4 Seat adjustment mechanism
5 Force-limiting apparatus
6 Deflecting arrangement
20 Seat base
22 Upper, seat-mounted guide element
23 Upper guide rail
30 Chassis
31 Vehicle floor
32 Lower, vehicle-mounted guide element
33 Lower guide rail
34 Spindle shaft
34' External thread
35 Spindle nut
35' Internal thread
40 Drive device
41 Support part
42 Longitudinal adjustment device
50 Force-limiting element
50' First region
50" Second region
50'" Third region
51 Metal sheet
52 First deformation section
54 Second deformation section
60 Deflecting element
60' Deflecting section
61 Deflecting roller
62 Deflecting element
62' Deflecting section
63 Deflecting roller
64 Deflecting element
64' Deflecting section
65 Deflecting roller
x Longitudinal direction of the vehicle
y Transverse direction of the vehicle
E Translation plane
F Direction of travel
P Double arrow
U Deflecting path

What is claimed is:

1. A vehicle seat console, comprising:
   at least one vehicle-mounted guide element;
   at least one seat-mounted guide element arranged parallel to the vehicle-mounted guide element;
   at least one longitudinal adjustment device, which is activatable by a drive device and is configured to effect a relative adjustment between the vehicle-mounted guide element and the seat-mounted guide element;
   a force-limiting apparatus, with a force-limiting element, provided between the longitudinal adjustment device and the vehicle-mounted guide element and/or between the longitudinal adjustment device and the seat-mounted guide element, wherein
   the force-limiting element has a first deformation section which deforms under a force acting thereon above a predetermined force threshold value,
   the force-limiting element has a second deformation section; and
   a deflecting arrangement which guides the second deformation section of the force-limiting element.

2. The vehicle seat console according to claim 1, wherein the longitudinal adjustment device has a spindle shaft and a spindle nut which is in meshing engagement with the spindle shaft.

3. The vehicle seat console according to claim 1, wherein the force-limiting element is coupled on a first side to the longitudinal adjustment device and on a second side to the seat-mounted guide element.

4. The vehicle seat console according to claim 1, wherein the force-limiting element is coupled on a first side to the longitudinal adjustment device and on a second side to the vehicle-mounted guide element.

5. The vehicle seat console according to claim 1, wherein the deflecting arrangement is formed from at least three deflecting elements, which are arranged in an alternating manner on two sides of a translation plane of the second deformation section, and which each have a deflecting section which projects into the translation plane or through the translation plane.

6. The vehicle seat console according to claim 5, wherein the deflecting elements are deflecting rollers.

7. The vehicle seat console according to claim 5, wherein the first and second deformation sections comprise a plastically deformable material or an elastically deformable material.

8. The vehicle seat console according to claim 7, wherein at least the second deformation section comprises a metal sheet.

9. The vehicle seat console according to claim 7, wherein at least the second deformation section has different deformation properties over its longitudinal extent.

10. The vehicle seat console according to claim 1, further comprising:
    a rigid connecting device which is interrupted in an event of a collision, wherein
    the rigid connecting device is provided, parallel to the force-limiting element, between the longitudinal adjustment device and an associated seat-mounted or an associated vehicle-mounted guide element.

11. A vehicle seat, comprising:
    the vehicle seat console according to claim 1; and
    a seat mounted on the vehicle seat console.

12. A motor vehicle, comprising:
    the vehicle seat according to claim 11; and
    a floor on which the vehicle seat is mounted.

* * * * *